Patented May 11, 1926.

1,584,473

UNITED STATES PATENT OFFICE.

AUGUST REGAL, OF BRNO, CZECHOSLOVAKIA.

PROCESS FOR THE PREPARATION OF ARTIFICIAL RESINS.

No Drawing. Application filed June 17, 1925. Serial No. 37,846.

It has been known for a long time tnat phenols and formaldehyde or its polymers combine with each other forming so-called products of condensation of an oily and resinous character. The reaction proceeds much better and in a shorter time if condensing agents, such as acids or bases or dissociating salts are added to the components. The condensation products formed are somewhat different, their physical and chemical properties depending from the amount of the condensing agents used, the time of heating and other conditions.

The object of the present invention is to use a condensing agent which is an organic compound and will be formed during the reaction. It has been found that such condensing agent has the important effect which could not be foreseen, that the final condensation product obtained after hardening the initial condensation product is distinguished by its extraordinary elasticity accompanied by great hardness, so that the articles made therefrom will stand great wear and tear without splitting, cracking or breaking.

In carrying out my invention I add to formaldehyde a small quantity of dimethylaniline to which some hexamethylentetramine or p-formaldehyde is mixed. The mass is boiled until the aniline compound has disappeared. The heating is then interrupted and phenol is added and the mass again boiled for some time with a reflux condenser until the initial condensation product has been formed.

By the action of dimethylaniline on formaldehyde in the presence of hexamethylentetramine a tetramethyl p-diaminodi-phenvlmethane is produced which acts as a condensing agent between the phenol and the aldehyde.

*Example.*

To 400 gr. of 40% formaldehyde 2 gr. of dimethylaniline are added and the mixture is boiled, whereupon 100 to 150 gr. of hexamethylentetramine and about the same quantity of p-formaldehyde are added. After some time the boiling is interrupted and the mass is allowed to cool to about 40° C. It is then treated with 1000 gr. of phenol and the whole mass is heated with a reflux condenser, until the condensation reaction is completely finished. The condensation product is a resol which by further heating can be converted into a resit.

Instead of dimethylaniline I can employ similar substances, for instance aromatic compounds, in which the hydrogen atoms of the amino group are replaced by other radicals. Of course, in that manner other products of addition of a similar character will be obtained, which also act as condensing agents.

Before hardening the initial condensation product, I can incorporate into it a great variety of inert solid materials, which may be added at any suitable stage of the process.

What I claim and wish to protect by Letters Patent of the United States is:—

A process for the manufacture of artificial resins, consisting in condensing phenols with formaldehyde at an elevated temperature in the presence of products of addition formed by allowing formaldehyde to act on an aromatic amino compound the H atoms of the amino groups being replaced by organic radicals.

In testimony whereof I affix my signature.

AUGUST REGAL.